US005649068A

United States Patent [19]
Boser et al.

[11] Patent Number: 5,649,068
[45] Date of Patent: Jul. 15, 1997

[54] PATTERN RECOGNITION SYSTEM USING SUPPORT VECTORS

[75] Inventors: Bernard Boser; Isabelle Guyon, both of Berkeley, Calif.; Vladimir Vapnik, Middletown, N.J.

[73] Assignee: Lucent Technologies Inc., Murray Hill, N.J.

[21] Appl. No.: 648,641

[22] Filed: May 16, 1996

Related U.S. Application Data

[63] Continuation of Ser. No. 97,785, Jul. 27, 1993, abandoned.
[51] Int. Cl.[6] ............................... G06E 1/00; G06E 3/00; G06F 15/16
[52] U.S. Cl. ........................ 395/23; 395/20; 382/159
[58] Field of Search ........................ 395/20–25, 27, 395/51, 61, 76; 382/155–159

[56] References Cited

U.S. PATENT DOCUMENTS

| 5,067,164 | 11/1991 | Denker et al. | 382/158 |
|---|---|---|---|
| 5,263,124 | 11/1993 | Weaver et al. | 382/159 |
| 5,276,771 | 1/1994 | Manukian et al. | 395/24 |
| 5,293,454 | 3/1994 | Kamiya | 395/23 |
| 5,299,284 | 3/1994 | Roy | 395/22 |
| 5,371,809 | 12/1994 | Desieno | 382/159 |
| 5,371,834 | 12/1994 | Tawel | 395/23 |
| 5,384,895 | 1/1995 | Rogers et al. | 395/23 |
| 5,384,896 | 1/1995 | Sakaue et al. | 395/24 |
| 5,440,651 | 8/1995 | Martin | 382/156 |

OTHER PUBLICATIONS

Sankar et al, "Growing and pruning neural tree networks"; IEEE Transactions on Computers, vol. 42, No. 3, Mar. 1993, pp. 291–299.

Kelly et al, "An adaptive algoritm for modifying hyperellipsoidal decision trees"; IJCNN, pp. 196–201 vol. 4, 7–11 Jun. 1992.

Leonard et al, "Radial basis function networks for classifying process faults"; IEEE Control Systems Magazine, vol. 11, iss. 3, pp.31–38, Apr. 1991.

Kleeman et al, "A computer integrated system for autonomous management of production"; Proceedings of Rensselaer's Second International Conference on Computer Integrated Manufacturing, pp. 324–330, 1990.

Eggers, et al, "Neural network data fusion concepts and application"; IJCNN International Joint Conference on Neural Networks, pp. 7–16 vol. 2, 17–21 Jun. 1990.

Lin et al, "Neural–Network–based fuzzy logic control and decision system"; IEEE Transactions on computers, pp. 1320–1336, vol. 40 iss. 12, Dec. 1991.

Primary Examiner—Tariq R. Hafiz

[57] ABSTRACT

A method is described wherein the dual representation mathematical principle is used for the design of decision systems. This principle permits some decision functions that are weighted sums of predefined functions to be represented as memory-based decision function. Using this principle a memory-based decision system with optimum margin is designed wherein weights and prototypes of training patterns of a memory-based decision function are determined such that the corresponding dual decision function satisfies the criterion of margin optimality.

10 Claims, 4 Drawing Sheets

PATTERN RECOGNITION SYSTEM USING SUPPORT VECTORS

This application is a continuation of application Ser. No. 08/097,785, filed on Jul. 27, 1993, now abandoned.

TECHNICAL FIELD

This invention relates to learning machines.

BACKGROUND

The main objective of a learning machine is to learn to recognize as well as possible an unknown pattern, given a set of training examples. Of particular importance in the learning process for a learning machine is the method of deriving a decision function based on the training examples, in order to distinguish representatives of one class from representatives of another class. The derived decision function can be used to recognize unknown patterns.

The ability of a decision system to perform well a particular task depends on several factors such as, the number of examples in the training set, the number of errors in the training set and the complexity of the classifier. Prior art decision systems are predicated on two major approaches, each one with particular limitations and drawbacks.

In an approach called the optimal margin approach, a learning machine determines a decision function which is a weighted sum of the components of the input patterns or a weighted sum of arbitrary predefined functions of the input patterns (e.g. Perceptrons and polynomial classifiers). The weights are determined such that a) the number of training patterns that are misclassified by an optimal margin decision system is minimized, and b) the margin between the correctly classified training patterns and the decision boundary is maximized. The margin is defined as the distance of the closest training patterns to the decision boundary. The weights that optimize the margin are a function of only a subset of all training patterns, called the "supporting patterns". The latter are patterns that are closest to the decision boundary.

The capacity of a decision system using the optimal margin approach or, more specifically, the ability of such a system to solve complex problems is restricted by the number of predefined functions. Accordingly, the number of predefined functions had to be limited for computational reasons, hence, limiting the range of applications of decision systems using the optimal margin approach.

In another approach called "memory-based decision approach" prior art decision systems were designed to allow decision functions (e.g. Radial Basis functions, Potential functions) to be represented by a weighted sum of kernel functions, each kernel function being itself a function of two patterns, namely, an input pattern and a memorized pattern (also called "memory" or "prototype"). In this approach, however, prototype patterns and weights are determined in a suboptimal way, thereby limiting the ability of the decision system to perform complex tasks.

SUMMARY

The present invention is directed to a method which a) takes advantage of the dual representation mathematical principle which permits some decision functions that are weighted sums of arbitrary predefined functions to be represented as memory-based decision function and vice versa, and b) allows design of memory-based decision systems with optimum margin in which weights and prototypes of training patterns of a memory-based decision function are determined such that the corresponding dual decision function satisfies the criterion of margin optimality.

In an embodiment of the principles of the invention, input data that may be represented, for example, by a set of vectors in n-dimensional space, are classified with decision rules that may be graphically represented by non-linear decision surfaces. In accordance with the invention, the classification is facilitated by transforming the input patterns to a new space using, for example, convolution of dot products, for linear separation by at least one optimal hyperplane represented by a decision function in the transformed space. According to one aspect of the invention, during the training process, training patterns or dot-product-transformed training patterns that are unused to determine the decision function, are identified and removed to allow the training process to be restarted with the remaining training patterns.

In a specific example implementing the principles of the invention, a processor, such as a UNIX workstation includes a memory which stores training patterns data which may be for example, bit-mapped pixel images data, and a classification program which is designed to associate input data (received by the workstation) with a specific class. This association is achieved by automatically attributing to the same class all the patterns that are on the same side of the optimal hyperplane (or hyperplanes) in the transformed space.

According to one of the aspects of the invention optimal decision hyperplane(s) is identified by simultaneously a) identifying support vectors from the training patterns data, and b) assigning weights to the support vectors through the mapping of the training patterns data into high dimension feature space. The steps described in a) and b) are performed jointly by a computer program in a manner that achieves correct classification of the training patterns while leaving the largest possible margin between the training patterns and the decision hyperplane in the feature space. Thus, input data received by the workstation from a source are classified in that workstation to allow the resulting classified data to be delivered to an output device. As a result, training patterns are assigned to the correct side of the decision hyperplane and as far as possible from the decision hyperplane in the feature space. It is mathematically provable that an automatic classification system built according to that principle has high probability to perform better than other systems on any particular classification task (such as speech or handwriting recognition).

Advantageously, our invention permits to build rapidly such an automatic classification system on a computer, given training patterns and regardless of the high dimension of selected feature space.

Advantageously, decision systems that are equivalent to linear classifiers in large multidimensional space, ($10^{12}$, $10^{16}$ dimensions), can be derived using a small amount of supporting patterns. Thus, decision systems of arbitrary capacity with both good speed and classification accuracy can be obtained. For example, polynomial decision functions of any order can be optimally selected. Furthermore, the number of computations required to classify patterns is only proportional to the number of supporting patterns and the number of inputs to the system when the kernel functions are properly selected.

DETAILED DESCRIPTION

Figure 1:
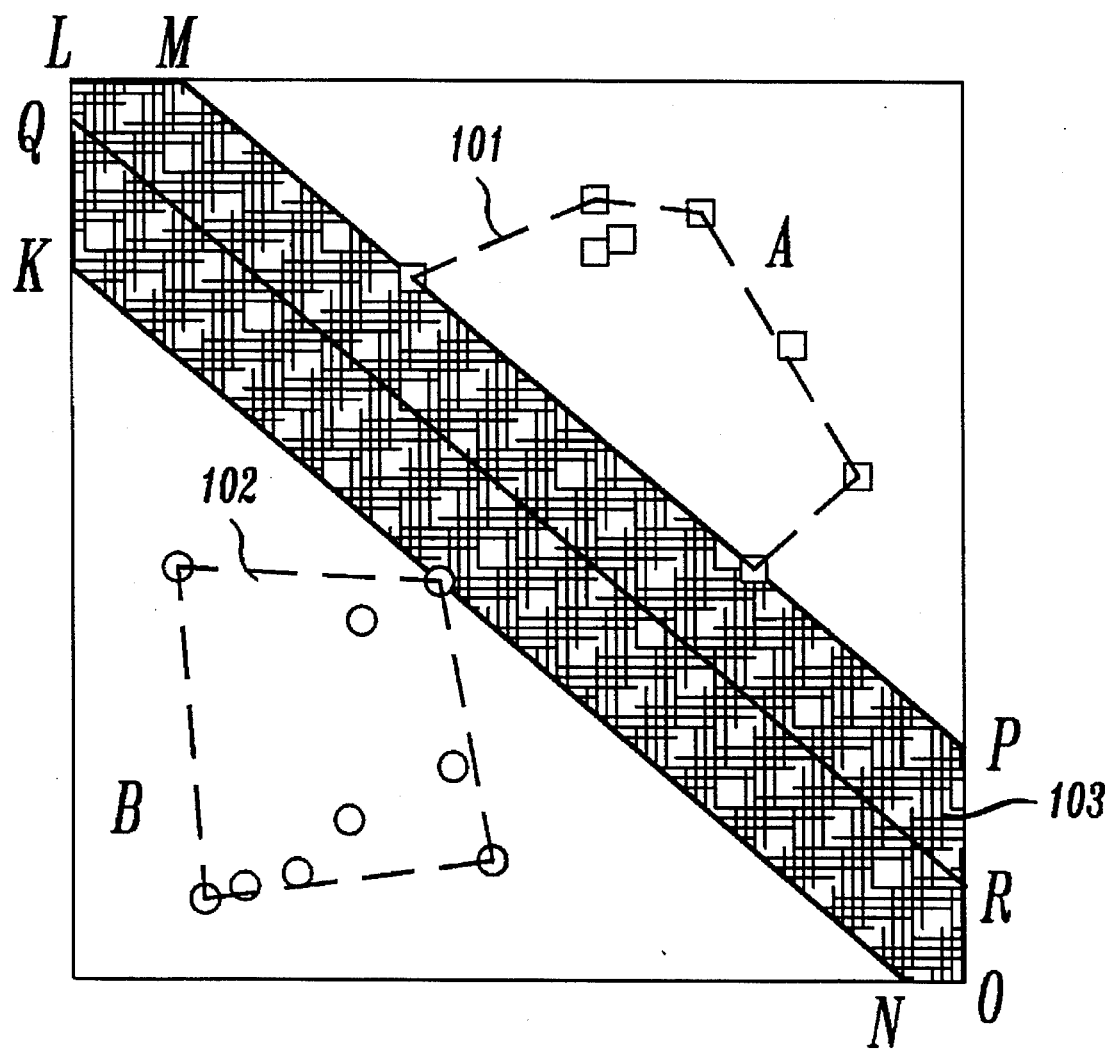
FIG. 1 illustrates a prior art decision system in which two classes in a training set are linearly separated by a decision boundary.

FIG. 1 shows a decision system in which two classes in a training set are linearly separated by a decision boundary. FIG. 1 graphically illustrates a training set and a linear decision boundary which yields the best generalization performance. FIG. 1 is presented in this example to facilitate a better understanding of the optimal margin technique that is used in the decision system of the invention. Shown in FIG. 1 is a training set extracted from two classes A and B. The training examples from class A are illustrated in small rectangular blocks while the training examples from class B are represented by small circles. The area 103 that is delimited by KLMNOP represents the largest possible margin between the decision boundary QR and the training patterns on either side. That margin provides the best generalization performance for a classifier trained with the training set of FIG. 1, as proved mathematically in further detail below. Graphically, this statement appears intuitively justifiable since a new example from class A is likely to fall within or near the convex envelope 101 of the examples of class A (and similarly for class B). By providing the largest possible "safety" margin, the chances are minimized that examples from class A and B cross the border to the wrong side.

An important property of the maximum margin solution is that it is only dependent upon a restricted number of training examples, called supporting patterns (or informative patterns). In FIG. 1, the supporting patterns as represented by those examples that lie on the margin and, therefore, are closest to the decision boundary. The number m of linearly independent supporting patterns satisfies the inequality: $m \leq \min(N+1,p)$. In this equation, (N+1) is the number of adjustable parameters and equals the well-known Vapnik-Chervonenkis dimension (VC-dimension), and p is the number of training examples. The generalization error is bounded by m/p and, therefore, m is a measure of the complexity of the learning problem. Because m is bounded by p and is generally a lot smaller than p, the maximum margin solution obtains good generalization even when the problem is grossly underdetermined, i.e. the number of training patterns p is much smaller than the number of adjustable parameters, N+1. As described in further detail below, the existence of supporting patterns is advantageous for computational reasons as well.

Figure 2:
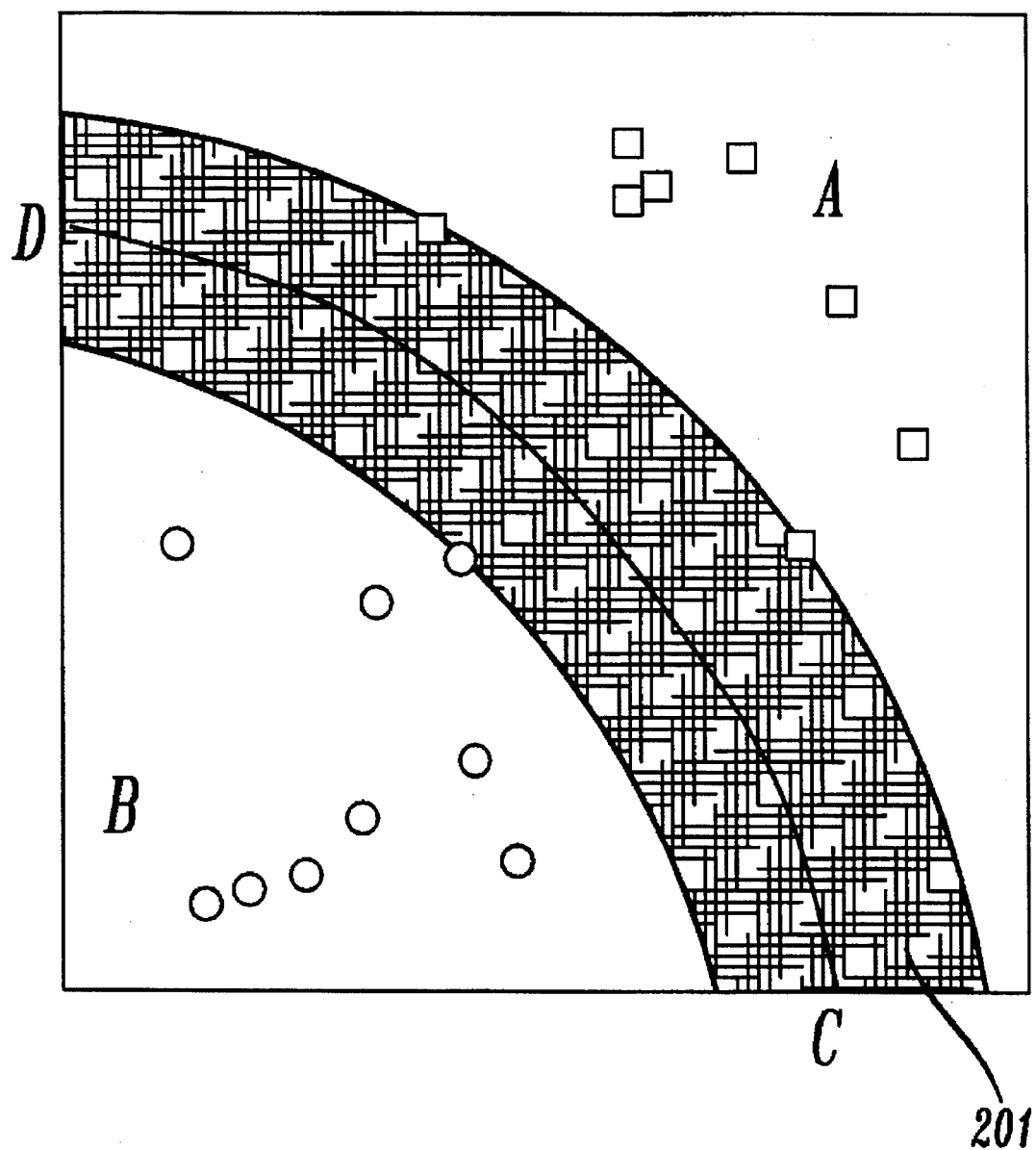
FIGS. 2 and 3 show examples of non-linear decision boundaries obtained by using the maximum margin memory-based method.
Figure 3:
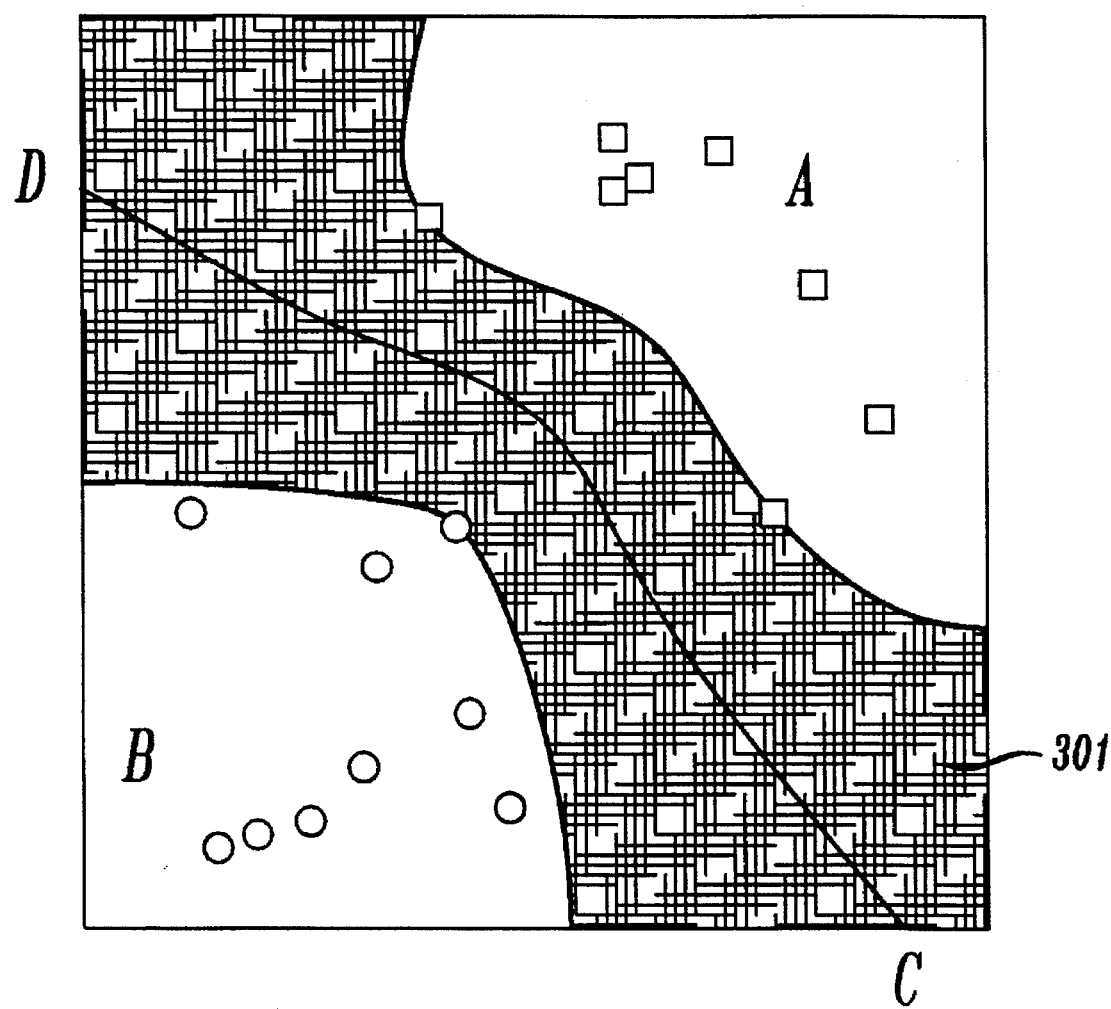

FIGS. 2 and 3 show examples of decision boundaries obtained by using the memory-based maximum margin technique. The decision boundaries shown in FIGS. 2 and 3 are derived (as explained in further detail below) by mapping the examples in set A and B to another space. FIG. 2 is an illustration of a second order polynomial decision boundary while FIG. 3 is an illustration of a Radial Basis Function decision boundary. The rainbow-shaped area 201 shown in FIG. 2 and the criss-crossed area of FIG. 3 represent the margin area 301 projected into the input space. The method of deriving the decision functions that yield the optimal margins in FIGS. 1, 2, and 3 are explained immediately below.

An optimal margin decision system designed in accordance with the invention, finds a decision function for pattern vectors x of dimension n belonging to either of two classes A and B. The input to the decision system is a set of p examples $x_i$ with labels $y_i$ $$(x_1,y_1),(x_2,y_2),(x_3,Y_3), \ldots (x_p,y_p)$$

where $y_k=1$ if $x_k \epsilon$ class A $y_k=1$ if $x_k \epsilon$ class B  (1)

From these training examples the decision system finds the parameters of the decision function D (x) during a learning phase. After training, the classification of unknown patterns is predicted according to the following rule:

$x \epsilon A$ if $D(x)>0$ $x \epsilon B$ otherwise.  (2)

The equation $D(x)=0$ determines the decision boundary. The decision functions must be linear in their parameters but are not restricted to linear dependencies of x. These functions can be expressed either in direct, or in dual space. The direct space notation is identical to the Perceptron decision function:

$$D(x) = \sum_{i=1}^{N} w_i \phi_i(x) + b. \quad (3)$$

In this equation the $\phi_i$ are predefined functions of x, and the $w_i$ and b are the adjustable parameters of the decision function. Polynomial classifiers are a special case of Perceptrons for which $\phi_i(x)$ are products of components of x. In the dual space, the decision functions are of the form $$D(x) = \sum_{k=1}^{p} \alpha_k K(x_k,x) + b. \quad (4)$$

The coefficients $\alpha_k$ are the parameters to be adjusted and the $x_k$ are the training patterns. The function K is a predefined kernel which can be, for example, a potential function or any Radial Basis Function. Under certain conditions, symmetric kernels possess finite or infinite series expansions of the form $$K(x,x') = \sum_{i} \phi_i(x)\phi_i(x'). \quad (5)$$

In particular, the kernel $K(x, x')=(x \cdot x'+1)^q$ corresponds to a polynomial expansion $\phi b(x)$ of order q. Other examples of kernel functions include $K(x,x')=\tanh(\gamma x \cdot x')$ $K(x,x')=\exp(\gamma x \cdot x')-1$ $K(x,x')=\exp(-\|x-x'\|^2/\gamma)$ $K(x,x')=\exp(-\|x-x'\|/\gamma)$ $K(x,x')=(x-x'+1)^q \exp(-\|x-x'\|/\gamma)$ Of particular importance in these examples is the fact that those kernel functions can be evaluated with a number of computations proportional to the number n of inputs that is the dimension of vector x.

Provided that the expansion stated in Equation (5) exists, Equations (3) and (4) are dual representations of the same decision function and $$w_i = \sum_{k=1}^{p} \alpha_k \phi_i(x_k). \tag{6}$$

The parameters $w_i$ are called direct parameters, and the $\alpha_k$ are referred to as dual parameters.

In this embodiment, this decision system is extended to train classifiers linear in their parameters. First, the margin between the class boundary and the training patterns is formulated in the direct space. This problem description is then transformed into the dual space by means of the Lagrangian. The resulting problem is that of maximizing a quadratic form with constraints and is amenable to efficient numeric optimization decision system.

In order to maximize the margin in the direct space, the decision function is expressed as:

$$D(x) = w \cdot \phi(x) + b \tag{7}$$

where w and $\phi(x)$ are N dimensional vectors and b is a bias. That decision function defines a separating hyperplane in $\phi$-space. The distance between this hyperplane and pattern x is $D(x)/\|w\|$. Assuming that a separation of the training set with margin M between the class boundary and the training patterns exists, all training patterns fulfill the following inequality:

$$\frac{y_k D(x_k)}{\|w\|} \geq M. \tag{8}$$

The objective of the decision system is to find the parameter vector w that maximizes M:

$$M^* = \max_{w, \|w\|=1} M \tag{9}$$

subject to: $y_k D(x_k) \geq M$, $k=1,2,\ldots,p$.

The bound M* is attained for those patterns satisfying $$\min_k y_k D(x_k) = M^*. \tag{10}$$

These patterns are called the supporting patterns of the decision boundary.

The problem of finding a hyperplane in $\phi$-space with maximum margin is therefore a minimax problem of the form:

$$\max_{w, \|w\|=1} \min_k y_k D(x_k). \tag{11}$$

The norm of the parameter vector in equations 9 and 11 is fixed to pick one of an infinite number of solutions that differ only in scaling. Instead of fixing the norm of w to take care of the scaling problem, the product of the margin M and the norm of a weight vector w can be fixed.

$$M\|w\| = 1. \tag{12}$$

Thus, maximizing the margin M is equivalent to minimizing the norm $\|w\|$. If the training data are not linearly separable, the maximum margin may be negative. In this case, $M\|w\| = -1$ is imposed. Maximizing the margin is then equivalent to maximizing $\|w\|$. If the training data are linearly separable, the problem of finding a maximum margin separating hyperplane w* stated in Equation (9) reduces to solving the following quadratic problem:

$$\min_w \|w\|^2 \tag{13}$$

under conditions $y_k D(x_k) \geq 1$, $k=1,2,\ldots,p$.

The maximum margin is $M^* = 1/\|w^*\|$.

In principle the problem stated in Equation 13 can be solved directly with numerical techniques. However, this approach is impractical when the dimensionality of the $\phi$-space is large or infinite. Moreover, no information is gained about the supporting patterns.

The problem of Equation (13) can be transformed into the dual space by means of the Lagrangian $$L(w,b,\alpha) = \frac{1}{2} \|w\|^2 - \sum_{k=1}^{p} \alpha_k [y_k D(x_k) - 1] \tag{14}$$

subject to $\alpha_k \geq 0$, $k=1, 2, \ldots, p$.

The factors $\alpha_k$ are called Lagrange multipliers or Kuhn-Tucker coefficients and satisfy the conditions $$\alpha_k (y_k D(x_k) - 1) = 0, \quad k=1,2,\ldots,p. \tag{15}$$

The factor one half has been included for cosmetic reasons; it does not change the solution.

The optimization problem of Equation 13 is equivalent to searching a saddle point of the function L (w, b, $\alpha$). This saddle point is the minimum of L (w, b, $\alpha$) with respect to w, and a maximum with respect to $\alpha(\alpha_k \geq 0)$. At the solution, the following necessary condition is met:

$$\frac{\partial L}{\partial w} = w^* - \sum_{k=1}^{p} \alpha_k^* y_k = 0, \tag{16}$$

hence $$w^* = \sum_{k=1}^{p} \alpha_k^* y_k \phi_k.$$

The patterns which satisfy $y_k D(x_k) = 1$ are the supporting patterns. According to equation 16 the vector w* that specifies the hyperplane with maximum margin is a linear combination of only the supporting patterns, which are those patterns for which $\alpha_k^* \neq 0$. Usually the number of supporting patterns is much smaller than the number p of patterns in the training set.

The dependence of the Lagrangian L(w, b, $\alpha$) on the weight vector w is removed by substituting the expansion of w* given by Equation 16 for w. Further transformations result in a Lagrangian which is a function of the parameters $\alpha$ and the bias b only:

$$J(\alpha,b) = \sum_{k=1}^{p} \alpha_k (1 - by_k) - \frac{1}{2} \alpha \cdot H \cdot \alpha \tag{17}$$

subject to $\alpha_k \geq 0$, $k=1, 2 \ldots, p$.

Here H is a square matrix of size p×p with elements $H_{ki} y_k y_i K(x_k x_i)$

In order for a unique solution to exist, H must be positive definite. For fixed bias b, the solution $\alpha^*$ is obtained by maximizing J($\alpha$, b) under the conditions $\alpha_k \geq 0$. Based on equations 7 and 16, the resulting decision function is of the form $$D(x) = w^* \cdot \phi(x) + b = \sum_k y_k \alpha_k^* K(x_k x) + b \cdot \alpha_k^* \geq 0, \tag{18}$$

where only the supporting patterns appear in the sum with nonzero weight.

The choice of the bias b gives rise to several variants of the decision system. Two variants are considered in this embodiment. In the first variant, the bias can be fixed a priori and not subjected to training. In the second variant, the function represented by Equation 17 can be optimized with respect to w and b. This approach gives the largest possible margin M*.

In both cases the solution is found with standard nonlinear optimization decision system for quadratic forms with linear constraints. The second approach gives the largest possible margin. There is no guarantee, however, that the second solution exhibits also the best generalization performance.

One possible strategy to optimize the margin with respect to both w and b allows Equation 17 to be solved for differences of pattern vectors to obtain $\alpha^*$ independent of the bias, which is computed subsequently. The margin in $\phi$-space is maximized when the decision boundary is halfway between the two classes. Hence the bias b* is obtained by applying Equation 18 to two arbitrary supporting patterns $x_A \in$ class A and $x_B \in$ class B and taking into account that $D(x_A)=1$ and $D(x_B)=-1$.

$$b^* = -\frac{1}{2}(w^* \cdot \phi(x_A) + w^* \cdot \phi(x_B)) \quad (19)$$
$$= -\frac{1}{2} \sum_{k=1}^{p} y_k \alpha_k^* [K(x_A, x_k) + K(x_B, x_k)].$$

Figure 4:
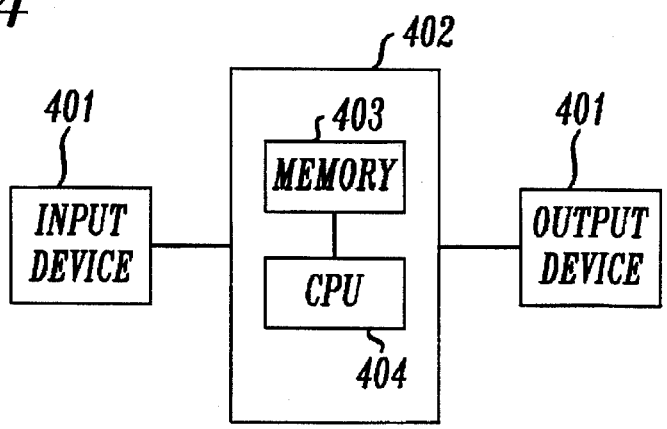
FIG. 4 shows some hardware components that may be used to implement the classification system of the invention.

The dimension of problem 17 equals the size of the training set, p. To avoid the need to solve a dual problem of exceedingly large dimensionality, the training data is divided into chunks that are processed iteratively. The maximum margin hypersurface is constructed for the first chunk and a new training set is formed consisting of the supporting patterns from the solution and those patterns $x_k$ in the second chunk of the training set for which $y_k D(x_k) < 1-\epsilon$. A new classifier is trained and used to construct a training set consisting of supporting patterns and examples from the first three chunks which satisfy $y_k D(x_k) < 1-\epsilon$. This process is repeated until the entire training set is separated. In an actual implementation of the principles of the invention, training data are received in the optimal margin classification via input device 401 of FIG. 4 which forwards the training data to processor 402. Input device 401 may be for example, a data reading device, such as a magnetic disk arranged to transfer training data stored therein to processor 402. The latter includes a memory 403 that stores the programmed instructions for the classification system that are illustratively shown in Appendices 1 and 2. Processor 402 may be implemented using, for example a workstation which runs under the UNIX® operating system to execute the programmed instructions in memory 403, using the processing power of Central Processing Unit (CPU) 404 in order to define decision rules for the classification of input data. Upon assigning input data to a particular class, processor 402 forwards the classified data to output device 405 which may be, for example, a display monitor or a processor capable of executing instructions of specialized graphics software to represent a multidimensional hyperplane.

Figure 5:
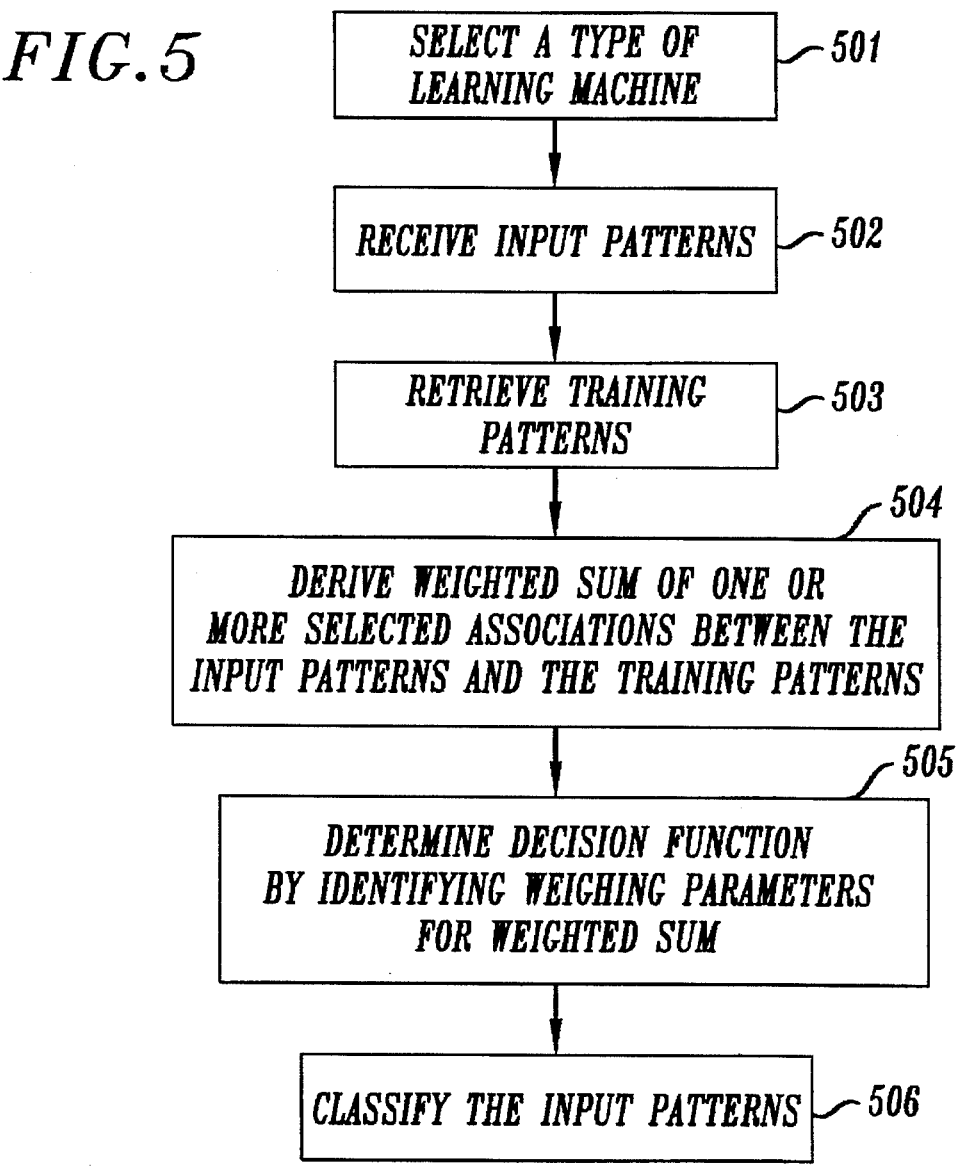
FIG. 5 is a flow diagram of programmed instructions executed by the processor of FIG. 4 to implement the principles of the invention.

FIG. 5 shows a flow diagram of instructions executed by processor 402 to classify input data. Upon command from a user via input device 401, processor 402, initiates the process contemplated by the invention by selecting a type of learning machine for the classification system, as indicated in step 501. The type of learning machine selected depends on the kernel function picked (high order polynomial or radial basis function, to name a few), and may be, for example, a neural network. Thus, when processor 402 receives in step 502, a set of input patterns from input device 401, processor 402 in step 503, retrieves a set of training patterns contained in memory 403. Thereafter, processor 402 in step 504, derives a weighted sum of one or more selected associations between the input patterns and the training patterns. This association may take the form of the kernel functions described above. In step 505, processor 402 determines the decision function for the classification task by identifying weighting parameters for the weighted sum. These weighting parameters permit processor 402 to identify supporting patterns that are used in the determination of the decision surface. Armed with the identified supporting patterns and the associated wighting parameters, processor 402 then, in step 506, uses the decision function to classify input data received from input device 401.

FIG. 5 shows a flow diagram of instructions executed by processor 402 to classify input data. Upon command from a user via input device 401, processor 402, initiates the process contemplated by the invention by selecting a type of learning machine for the classification system, as indicated in step 501. The type of learning machine selected depends on the kernel function picked (high order polynomial or radial basis function, to name a few), and may be, for example, a neural network. Thus, when processor 402 receives in step 502, a set of input patterns from input device 401, processor 402 in step 503, retrieves a set of training patterns contained in memory 403. Thereafter, processor 402 in step 504, derives a weighted sum of one or more selected associations between the input patterns and the training patterns. This association may take the form of the kernel functions described above. In step 505, processor 402 determines the decision function for the classification task by identifying weighting parameters for the weighted sum. These weighting parameters permit processor 402 to identify supporting patterns that are used in the determination of the decision surface. Armed with the identified supporting patterns and the associated wighting parameters, processor 402 then, in step 506, uses the decision function to classify input data received from input device 401.

A decision system designed according to the principles of the invention exhibit some interesting properties. Some of these properties are described below.

Since maximizing the margin between the decision boundary and the training patterns is equivalent to maximizing a quadratic form in the positive quadrant, there are no local minima and the solution is always unique if H has full rank. At the optimum $$J(\alpha^*) = \frac{1}{2} \|w^*\|^2 = \frac{1}{2(M^*)^2} = \frac{1}{2} \sum_{k=1}^{p} \alpha_k^*. \quad (20)$$

The uniqueness of the solution is a consequence of the maximum margin cost function and represents an important advantage over other decision systems for which the solution depends on the initial conditions or other parameters that are difficult to control.

Another benefit of the maximum margin objective is its insensitivity to small changes of the parameters w or $\alpha$. Since the decision function D(x) is a linear function of w in the direct space, and of $\alpha$ in the dual space, the probability of misclassifications due to parameter variations of the components of these vectors is minimized for maximum margin. The robustness of the solution—and potentially its generalization performance—can be increased further by omitting some supporting patterns from the solution. Preferably, a selected subset of supporting patterns can be removed from the training set and the solution recomputed with this newly redefined training set. Equation 20 indicates that the largest increase in the maximum margin M* occurs when the supporting patterns with largest $\alpha_k^*$ are eliminated. The elimination can be performed automatically or with assistance from a supervisor. To facilitate the elimination procedure, patterns can be ranked according to the value of the coefficient $\alpha_k^*$. This feature gives rise to other important uses of the optimum margin decision system in database cleaning applications.

Another property of the decision system of the invention is that the optimum margin decision system performs automatic capacity tuning of the decision function to achieve good generalization. An estimate for an upper bound of the generalization error is obtained with the "leave-one-out" method: A pattern $x_k$ is removed from the training set. A classifier is then trained on the remaining patterns and tested on $x_k$. This process is repeated for all p training patterns. The generalization error is estimated by the ratio of misclassified patterns over p. For a maximum margin classifier, two cases arise. In the first case if $x_k$ is not a supporting pattern, the decision boundary is unchanged and $x_k$ will be classified correctly. In the second case, if $x_k$ is a supporting pattern, two possibilities exist. In the first possibility, the pattern $x_k$ is linearly dependent on the other supporting patterns. In this case it will be classified correctly. In the second possibility, $x_k$ is linearly independent from the other supporting patterns. In this case the outcome is uncertain. In the worst case m' linearly independent supporting patterns are misclassified when they are omitted from the training data.

Hence the frequency of errors obtained by this method is at most m'/p, and has no direct relationship with the number of adjustable parameters. The number of linearly independent supporting patterns m' itself is bounded by min(N,p). This suggests that the number of supporting patterns is related to an effective capacity of the classifier that is usually much smaller than the VC-dimension, N+1.

In polynomial classifiers, for example, $N \approx n^q$, where n is the dimension of x-space and q is the order of the polynomial. In practice, $m \leq p \ll N$, i.e. the number of supporting patterns is much smaller than the dimension of the $\phi$-space. The capacity tuning realized by the maximum margin decision system is essential to get generalization with high-order polynomial classifiers. In addition, further capacity tuning can be achieved by adjusting certain parameters of the kernel functions. For example, the order q in the polynomial classifier or the parameter $\gamma$ in the Radial Basis Function can be tuned in order to achieve better classification performance.

Appendices 1 and 2 are computer program listings representing an illustrative implementation of a decision system designed in accordance with the invention. The program in Appendix 1 is written in the generally known C computer language and is used to derive an optimal margin decision function. The program in Appendix 2 is written in LISP and is the user interface for input and output operations. The program in Appendix 1 can be compiled and executed on Sun Microsystems workstations running the well-known UNIX operating system. The LISP program in Appendix 2 requires a learning machine LISP interpreter to be executed. These computer programs are copyrighted programs owned by the American Telephone and Telegraph Co. (Copyright 1993 American Telephone and Telegraph Co.) and are not to be copied except in connection with making paper copies of this patent.

Appendix 1

// Block2D.h ifndef BLOCK2DH
define BLOCK2DH typedef double T;

```
// template
class Block2D {
   unsigned sz1, sz2;
   T **data;
public:
   Block2D();
   Block2D(unsigned, unsigned);
   ~Block2D();
   int size1() const { return sz1; }     // # vectors
   int size2() const { return sz2; }     // # elements per vector
   int size(unsigned, unsigned);         // # vectors, elements per vector
   int reserve(unsigned, unsigned);      // # vectors, elements per vector
   T& operator()(unsigned i, unsigned j) { return data[i][j]; }
   T* operator[](int i) { return data[i]; }
   operator T**() { return data; }
}; // Block2D
``` endif
// Hash.h ifndef HASHH
define HASHH include "SPool.h"

```
// define type here (until templates are available)
struct Key { int id1, id2; };
typedef double Value;

typedef int(*hash)(const Key);
typedef int(*hequal)(const Key, const Key);

// template
class Hash {
   struct elem {
```

```
        Key key; Value value; elem *next;
        elem(Key k, Value v, elem *n) { key = k; value = v; next = n; }
        ~elem() { if (next) delete next; }
        void* operator new(size_t sz) { return alloc(sz); }
        void operator delete(void *p, size_t sz) { free(p, sz); }
    }; // elem
    unsigned m;              // table size
    elem **tab;              // hash table tab[m]
    hash hash_func;          // compute hash value from Key
    hequal equal_func;       // compare two Keys for equality
public:
    Hash(hash, hequal, unsigned m = 211);  // primes work better
    ~Hash();                 // remove all allocated space
    void set(Key, Value);    // set/alter entry
    Value *get(const Key);   // get entry (0 if not defined)
    double uniformity(int &n, int &m, int &depth) const;
        // uniformity of usage (1 is best), number entries, size of table
}; // Hash endif
// Hyper.h
// B. Boser 1/10/92 ifndef HYPERH
define HYPERH include "Hash.h"
include <Block.h> typedef double Flt;
Blockdeclare(Flt);
typedef Block(Flt) FltVec;
Blockdeclare(int);
typedef Block(int) IntVec;

typedef Flt (*sm)(int, int);        // similarity measure function class SimilarityMeasure {           // calls sm and caches result
    Hash *hash;
    sm k;
public:
    SimilarityMeasure(sm k, unsigned hash_size = 8097);
    ~SimilarityMeasure();
    Flt K(int id1, int id2);
    void hash_statistics(double &uniformity, int &n, int &m, int &d) const;
        // uniformity of usage (1 is best), number entries, size of hash table
```

```
}; // SimilarityMeasure class Hyper {
    SimilarityMeasure *sm;       // similarity function K(xi, xj)
    int lA, lB;                   // size of training data sets
    IntVec patA, patB;            // indices of training data
    int na,nb;                    // number of supporting patterns
    IntVec supA;                  // indices of supporting patterns
    IntVec supB;
    FltVec alphaA;                // weights for supporting patterns
    FltVec alphaB;                // weights for supporting patterns
    Flt W, norm_psi;              // computed by HyperStep
    int debug;                    // 0: no msg, 1: some, 2: verbose
protected:
    void AddA(int id, Flt alpha = 0.001);  // add to supA
    void AddB(int id, Flt alpha = 0.001);  // add to supB
    void Eliminate(int id);       // eliminate from patA, patB, sup
    int AddSupport(Flt eps);      // add supporting pattern if needed
    int Remove0();                // remove sup with alpha = 0
    Flt OrderDb(int *id, int n, int ascending = 1); // order acc. psi * x
public:
    Hyper(SimilarityMeasure *sm, int debug = 0);
    int Classifier(Flt eps = 0.1);  // make classifier from pat and sup
    Flt Classify(int idx);          // (psi * x) / norm_psi
    Flt Psi_x(int idx);             // psi times x
    void SetDataBase(int *pA, int lA, int *pB, int lB);
    void SetSupport(int nA, int nB, const int *supA, const int *supB,
            const Flt *alphaA = 0, const Flt *alphaB = 0);
    void GetSupport(int &nA, int &nB, const int *& supA, const int *& supB,
            const Flt *& alphaA, const Flt *& alphaB);
    void HyperStep(Flt eps);        // find weights for supA, supB
    Flt *GetAlphaA(int &nA) { nA = na; return alphaA; }
    Flt *GetAlphaB(int &nB) { nB = nb; return alphaB; }
    Flt RohOpt() const;             // sqrt(1/2W)
}; // Hyper endif
// Sort.h
// B. Boser 1/10/92 ifndef SORTH
define SORTH

// 1st argument: number of items to be sorted
// 2nd argument: order ascending (1), descending (0)
// 3rd argument: sort key (sorted inplace)
```

```
// 4th and further arguments: sorted inplace according to key void sort(int n, int ascending, double*, int*);

endif
// Vector.h
// B. Boser  1/10/92 ifndef VECTORH
define VECTORH typedef double flt;

flt dot(flt *x, flt *y, unsigned n);        // dot product
flt vmv(flt *v, flt **m, unsigned n);       // v[n] * m[n][n] * v[n]
flt tally(flt *v, unsigned n);              // sum of all elements in v
void init(flt *v, unsigned n, flt x = 0);   // initialize all elements endif
```

```
// Block2D.c include "Block2D.h"

int inline max(int i, int j) {
   return i > j ? i : j;
}; // max

Block2D::Block2D() {
   sz1 = sz2 = 0;  data = 0;
}; // Block2D

Block2D::Block2D(unsigned s1, unsigned s2) {
   sz1 = sz2 = 0;  data = 0;
   size(s1, s2);
}; // Block2D Block2D::~Block2D() {
   for (int i=0;  i<sz1;  i++) delete[] data[i];
   sz1 = sz2 = 0;  data = 0;
}; // Block2D int Block2D::reserve(unsigned s1, unsigned s2) {
   return (sz1 <= s1 || sz2 <= s2) ?
      size(max(20, s1+s1/2), max(20, s2+s2/2)) : 1;
}; // reserve int Block2D::size(unsigned s1, unsigned s2) {
   typedef T *Tp;
   if (s1 > sz1) {                    // more vectors
      Tp *d = new Tp[s1];
         Tp *src = data, *dst = d;
         for (int i=0;  i<sz1;  i++) *dst++ = *src++;
         if (s2 > sz2) for (i=sz1;  i<s1;  i++) *dst++ = 0;
            else  for (i=sz1;  i<s1;  i++) *dst++ = new T[sz2];
         if (data) delete[] data;  data = d;  sz1 = s1;
   }
   if (s2 > sz2) {                    // more elements per vector
      for (int i=0;  i<sz1;  i++) {
         T* v = data[i];
         if (v) {
            T *vv = new T[s2];
            T *dst = vv, *src = v;
            for (int j=0;  j<sz2;  j++) *dst++ = *src++;
            static T initial;
            for (j=sz2;  j<s2;  j++) *dst++ = initial;
```

```
                    delete[] v;  data[i] = vv;
                } else {
                    data[i] = new T[s2];
                }
            };  // for
            sz2 = s2;
        }
        return 1;
    };  // size
// Hash.c
// B. Boser  1/10/92 include "Hash.h"

Hash::Hash(hash h, hequal e, unsigned mm) {
    hash_func = h;  equal_func = e;  m = mm;
    typedef elem *elemp;
    tab = new elemp[m];
    elem **p = tab;
    for (int i=0; i<m; i++) *p++ = 0;
};  // Hash Hash::~Hash() {
    for (int i=0; i<m; i++) if (tab[i]) delete tab[i];
    delete[] tab;  tab = 0;  m = 0;
};  // ~Hash void Hash::set(Key k, Value v) {
    unsigned h = hash_func(k) % m;
    elem *p = tab[h];
    while (p) {
        if (equal_func(k, p->key)) {
            p->value = v;  return;
        }
        p = p->next;
    };  // while
    tab[h] = new elem(k, v, tab[h]);
};  // set Value* Hash::get(const Key k) {
    elem *p = tab[hash_func(k) % m];
    while (p) {
        if (equal_func(k, p->key)) return &(p->value);
        p = p->next;
    }
    return 0;
```

```
}; // get double Hash::uniformity(int &nn, int &mm, int &max_depth) const {
    nn = 0; mm = m; max_depth = 0; int b = 0;
    for (int i=0; i<m; i++) {
        int depth = 0;
        elem *pp = tab[i];
        while (pp) { nn++; depth++; pp = pp->next; }
        b += depth * (depth + 1);
        if (depth > max_depth) max_depth = depth;
    }
    double x = m * b;
    double y = (nn + 2 * m - 1) * nn;
    return x / y;
}; // uniformity //////////////////////////////////////////////////////////
/***
#include "Define.h"

static Hash *h = 0;
static CP h_func;

static int hash_func(const Key key) {
    CP form = NewConsCell(ref(h_func), NewConsCell(ref(key)));
    int r = (int)form->EvalReal(); unref(form);
    return r;
}; // hash_func static int equal_func(const Key k1, const Key k2) {
    return equal(k1, k2);
}; // equal_func static CP xhnew(CP param) {
    h_func = a_(param);
    unsigned m = 211;
    if (param != Nil) m = (unsigned)a_real(param);
    if (h) delete h;
    h = new Hash(hash_func, equal_func, m);
    return Nil;
}; // xhnew static CP xhget(CP param) {
    CP key = a_(param);
```

```
    CP *value = h->get(key); unref(key);
    return value ? ref(*value) : Nil;
}; // xhget static CP xhset(CP param) {
    CP key = a_(param);
    CP val = a_(param);
    h->set(key, val);
    return Nil;
}; // xhset static CP xhunif(CP) {
    int n, m;
    return NewRealCell(h->uniformity(n, m));
}; // xhunif static bool hnewS = DefineFunction("hnew", xhnew);
static bool hgetS = DefineFunction("hget", xhget);
static bool hsetS = DefineFunction("hset", xhset);
static bool hunifS = DefineFunction("hunif", xhunif);

***/
// Hyper.c
// B. Boser 1/10/92 include "Hyper.h"
include "Block2D.h"
#include "Sort.h"
#include "Vector.h"
#include "File.h"
#include "Error.h"
#include "Util.h"
include <math.h> extern "C" {
    int malloc_debug(int);
    int malloc_verify();
    void mallocmap();
}; // extern "C"

Blockimplement(int);
Blockimplement(Flt);

#define min(a,b) (((a)>(b)) ? (b) : (a))
#define max(a,b) (((a)>(b)) ? (a) : (b))
```

////////////////////////////////////////////////////
// SimilarityFunction

```
static int hashfun(const Key k) {
   return 65557 * k.id1 + k.id2;
}; // hashfun static int equalfun(const Key k1, const Key k2) {
   return k1.id1 == k2.id1 && k1.id2 == k2.id2;
}; // equalfun SimilarityMeasure::SimilarityMeasure(sm kk, unsigned m) {
   k = kk; hash = new Hash(hashfun, equalfun, m);
}; // SimilarityMeasure Flt SimilarityMeasure::K(int id1, int id2) {
   if (id2 < id1) { int t = id1; id1 = id2; id2 = t; }
   if (id1 < 0) return k(id1, id2);
   Key kk; kk.id1 = id1; kk.id2 = id2;
   Flt *val = hash->get(kk);
   if (val) return *val;
   Flt f = k(id1, id2);
   hash->set(kk, f);
   return f;
}; // K void SimilarityMeasure::hash_statistics(double &uni, int &n, int &m, int &d)
const {
   uni = hash->uniformity(n, m, d);
}; // hast_statistics
```

////////////////////////////////////////////////////
// Hyper

```
Hyper::Hyper(SimilarityMeasure *s_m, int d) {
   sm = s_m; lA = lB = na = nb = 0; debug = d;
   W = 0; norm_psi = 1;
}; // Hyper void Hyper::HyperStep(Flt eps) {
   static Block2D Z(50, 50);
   static FltVec alpha(50);
   static FltVec alpha_dot_k1(50);
   static FltVec alpha_bar_k1(50);
   int n = na + nb;
```

```
Z.reserve(n, n);
alpha.reserve(n);
alpha_dot_k1.reserve(n);
alpha_bar_k1.reserve(n);

Flt norm_psi_squared;
Flt norm_alpha_dot_k1_squared;
Flt norm_alpha_dot_k_squared = 0.998 * n;
int k = 1;                 // iteration count
init(alpha_bar_k1, n);

// compute Z
for (int i=0; i<n; i++)
    for (int j=i; j<n; j++) {
        Flt f = sm->K((i < na) ? supA[i] : supB[i-na],
                      (j < na) ? supA[j] : supB[j-na]);
        if ((i >= na) && (j < na) ||
            (i < na) && (j >= na)) f = -f;
        Z[i][j] = Z[j][i] = f;
}
for (i=0; i<na; i++) alpha[i   ] = alphaA[i];
for (i=0; i<nb; i++) alpha[i+na] = alphaB[i];
if (debug >= 20) for (i=0; i<n; i++) {
    fprintf(Stderr, "0[%2d] =", i);
    for (j=0; j<n; j++)
        fprintf(Stderr, " %6g", Z[i][j]);
}

// maximize W
while (1) {
    if (debug >= 2)
        fprintf(Stderr, "102d. hyper-step ------------------------", k);
    // compute gradient alpha_dot_k1
    for (i=0; i<n; i++) {
        Flt u = dot(Z[i], alpha, n);
        alpha_dot_k1[i] = (alpha[i] != 0 || u < 1) ? 1-u : 0;
    }
    if (debug >= 2) {
        fprintf(Stderr, "0_dot =");
        for (i=0; i<n; i++) fprintf(Stderr, " %6g", alpha_dot_k1[i]);
    }

// update conjugate gradient alpha_bar_k1
    norm_alpha_dot_k1_squared = dot(alpha_dot_k1, alpha_dot_k1, n);
    Flt step = norm_alpha_dot_k1_squared / norm_alpha_dot_k_squared;
    for (i=0; i<n; i++)
```

```
    alpha_bar_k1[i] = step * alpha_bar_k1[i] + alpha_dot_k1[i];
norm_alpha_dot_k_squared = norm_alpha_dot_k1_squared;
if (debug >= 2) {
   fprintf(Stderr, "0-bar =");
   for (i=0; i<n; i++) fprintf(Stderr, " %6g", alpha_bar_k1[i]);
}

// update alpha
Flt norm_psi_bar_squared = vmv(alpha_bar_k1, Z, n);
step = norm_psi_bar_squared > 1e-12 ?
    norm_alpha_dot_k1_squared / norm_psi_bar_squared : 1e-12;
int zero = -1;
for (i=0; i<n; i++) {
   if (alpha_bar_k1[i] < 0) {
       Flt a_div_ab = - alpha[i] / alpha_bar_k1[i];
       if (a_div_ab < step) { step = a_div_ab; zero = i; }
   }
}
if (debug >= 2) fprintf(Stderr, "0 = %f0, step);
for (i=0; i<n; i++) alpha[i] += step * alpha_bar_k1[i];
if (zero >= 0) {
   alpha[zero] = 0; init(alpha_bar_k1, n);
}
if (debug >= 2) {
   fprintf(Stderr, "0lpha =");
   for (i=0; i<n; i++) fprintf(Stderr, " %6g", alpha[i]);
}

// compute norm_psi_squared and W
norm_psi_squared = vmv(alpha, Z, n);
W = tally(alpha, n) - 0.5 * norm_psi_squared;
if (debug >= 2) {
   fprintf(Stderr, "0-psi-sq = %f, ", norm_psi_squared);
   fprintf(Stderr, "n-psb-sq = %f, ", norm_psi_bar_squared);
   fprintf(Stderr, "W = %f, ", W);
   fprintf(Stderr, "roh-opt = %f0, 1.0/sqrt(2*W));
}

// done?
if (W > 1e9) break;
if (k > 5 * n) break;
i = 0;
while (i < n && abs(alpha_dot_k1[i]) < eps) i++;
if (debug >= 2 && i == n)
   fprintf(Stderr, "converged after %d iterations0, k);
if (i == n) break;
```

```
      k++;
   }
   for (i=0; i<na; i++) alphaA[i] = alpha[i];
   for (i=0; i<nb; i++) alphaB[i] = alpha[i+na];
   norm_psi = sqrt(fabs(norm_psi_squared));
}; // HyperStep void Hyper::SetDataBase(int *pA, int lA, int *pB, int lB) {
   patA.reserve(lA); for (int i=0; i<lA; i++) patA[i] = *pA++; lA = lA;
   patB.reserve(lB); for ( i=0; i<lB; i++) patB[i] = *pB++; lB = lB;
}; // SetDataBase void Hyper::SetSupport(int nA, int nB, const int *sA, const int *sB,
                const Flt *aA, const Flt *aB) {
   na = nb = 0;
   for (int i=0; i<nA; i++) AddA(*sA++, aA ? *aA++ : 0.001);
   for ( i=0; i<nB; i++) AddB(*sB++, aB ? *aB++ : 0.001);
}; // SetSupport void Hyper::GetSupport(int &nA, int &nB, const int *&sA,const int *&sB,
                const Flt *&aA, const Flt *&aB) {
   sort(na, 0, alphaA, supA);
   sort(nb, 0, alphaB, supB);
   nA = na; nB = nb; sA = supA; sB = supB; aA = alphaA; aB = alphaB;
}; // GetSupport Flt Hyper::Psi_x(int idx) {
   Flt r = 0;
   for (int i=0; i<na; i++) r+= alphaA[i] * sm->K(idx, supA[i]);
   for ( i=0; i<nb; i++) r-= alphaB[i] * sm->K(idx, supB[i]);
   return r;
}; // Psi_x Flt Hyper::Classify(int idx) {
   return Psi_x(idx) / norm_psi;
}; // Classify int Hyper::Classifier(Flt eps) {
   // return final number of iterations
   if (lA == 0 || lB == 0) return na+nb;
   for (int i=0; i<min(10,lA); i++) AddA(patA[i]);
   for ( i=0; i<min(10,lB); i++) AddB(patB[i]);
   int iter = 0;
   do {
      HyperStep(iter % 32 ? 0.4*eps : 1e-6); Remove0();
      if (W > 1e9) break;
```

```
        iter++;
        if (debug >= 1) {
            fprintf(Stderr, "%3d. ", iter);
            fprintf(Stderr, "roh_opt = %f, ", RohOpt());
            fprintf(Stderr, "supp. A=%d, ", na);
            fprintf(Stderr, "B=%d0, nb);
        }
    } while (AddSupport(eps));
    HyperStep(1e-6); Remove0();    // remove extraneous supporting patterns
    return W > 1e9 ? -1 : iter;
}; // Classifier void Hyper::AddA(int id, Flt alph) {
    if (debug >= 2) {
        fprintf(Stderr, "    adding sup. pat. from class A: %4d, ", id);
        fprintf(Stderr, "total: %4d0, na);
    }
    supA.reserve(na); alphaA.reserve(na);
    supA[na] = id; alphaA[na] = alph; na++;
}; // AddA void Hyper::AddB(int id, Flt alph) {
    if (debug >= 2) {
        fprintf(Stderr, "    adding sup. pat. from class B: %4d, ", id);
        fprintf(Stderr, "total: %4d0, nb);
    }
    supB.reserve(nb); alphaB.reserve(nb);
    supB[nb] = id; alphaB[nb] = alph; nb++;
}; // AddB void Hyper::Eliminate(int) {
}; // Eliminate Flt Hyper::OrderDb(int *id, int n, int ascending) {
    static FltVec px(100);
    px.reserve(n);
    for (int i=0; i<n; i++) px[i] = Psi_x(id[i]);
    sort(n, ascending, px, id);
    return px[0];
}; // OrderDb int Hyper::AddSupport(Flt eps) {
    // return true if supporting (?) pattern was added
    Flt M = 1.0/norm_psi;
    if (debug >= 2) {
        Flt sum = 0;
```

```
            for (int i=0; i<na; i++) sum += alphaA[i];
            for (    i=0; i<nb; i++) sum += alphaB[i];
            fprintf(Stderr, "   norm_w = %f, ", norm_psi);
            fprintf(Stderr, "sqrt(sum alpha) = %f, ", sqrt(sum));
            fprintf(Stderr, "M* = %f0, M);
        }
        int addA = 0, addB = 0;  M -= M*eps;
        for (int i=0; i<lA && addA<5; i++)
            if ( Psi_x(patA[i]) < M ) {
                if (debug >= 2) {
                    fprintf(Stderr, "   adding support A[%4d], ", i);
                    fprintf(Stderr, "d = %f0, Psi_x(patA[i]));
                }
                AddA(patA[i]); addA++;
            }
        for (    i=0; i<lB && addB<5; i++)
            if (-Psi_x(patB[i]) < M ) {
                if (debug >= 2) {
                    fprintf(Stderr, "   adding support B[%4d], ", i);
                    fprintf(Stderr, "d = %f0, Psi_x(patB[i]));
                }
                AddB(patB[i]); addB++;
            }
        return (addA > 0 || addB > 0);
    }; // AddSupport int Hyper::Remove0() {
    // return # pattern removed from supA, supB
    int x = 0;     // # patterns removed
    int i = 0;     // index into supA, supB
    while (i < na) {
        if (alphaA[i] == 0) {
            while (alphaA[na-1] == 0) { x++; na--; }  // chop at end
            if (na > i+1) {                            // anything left?
                na--; x++;
                alphaA[i] = alphaA[na]; supA[i] = supA[na];
            } else break;
        }
        i++;
    }
    i = 0;
    while (i < nb) {
        if (alphaB[i] == 0) {
            while (alphaB[nb-1] == 0) { x++; nb--; }  // chop at end
            if (nb > i+1) {                            // anything left?
                nb--; x++;
```

```
            alphaB[i] = alphaB[nb];  supB[i] = supB[nb];
      } else break;
    }
    i++;
  }
  if (x > 0 && debug >= -1)
      fprintf(Stderr, "   removed %d non-supporting pattern(s)0, x);
  return x;
}; // Remove0

Flt Hyper::RohOpt() const {
  return sqrt(0.5/W);
}; // RohOpt

////////////////////////////////////////////////////////////// include "Cells.h"
include "Define.h"

static CP s_func = 0;

//////////////////////////////////////////////////////////////
// SimilarityFunction Flt sim_func(int id1, int id2) {
  CP form = NewConsCell(ref(s_func),
                   NewConsCell(NewRealCell(id1),
                        NewConsCell(NewRealCell(id2))));
  Flt f = form->EvalReal(); unref(form);
  return f;
}; // sim_func static CP xnew_sm(CP param) {
  s_func = a_(param);
  unsigned m = 8097;
  if (param != Nil) m = (unsigned)a_real(param);
  return NewRealCell(Real(unsigned(new SimilarityMeasure(sim_func, m))));
}; // xnew_sm static CP xsm(CP param) {
  unsigned i = (unsigned)a_real(param);
  SimilarityMeasure *sm = (SimilarityMeasure*)i;
  int id1 = (unsigned)a_real(param);
  int id2 = (unsigned)a_real(param);
```

```
    return NewRealCell(sm->K(id1, id2));
}; // xsm static CP xsm_statistics(CP param) {
    unsigned i = (unsigned)a_real(param);
    SimilarityMeasure *sm = (SimilarityMeasure*)i;
    double uni; int n, m, d;
    sm->hash_statistics(uni, n, m, d);
    return NewConsCell(NewRealCell(uni),
                NewConsCell(NewRealCell(n),
                    NewConsCell(NewRealCell(m),
                        NewConsCell(NewRealCell(d)))));
}; // xsm_statistics static bool xnew_smS = DefineFunction("new-sm", xnew_sm);
static bool xsmS = DefineFunction("sm", xsm);
static bool xsm_statisticsS = DefineFunction("sm-statistics", xsm_statistics);

//////////////////////////////////////////////////////////
// similarity functions static CP xgaussd(CP param) {
    Matrix m1 = a_matrix(param);
    Matrix m2 = a_matrix(param);
    Float gamma = a_real(param);
    int sz;
    if ((sz = m1.size()) != m2.size()) error('E', "vector sizes differ");
    Float *p1 = m1.matrix1D();
    Float *p2 = m2.matrix1D();
    Float s = 0;
    for (int i=0; i<sz; i++) { Float f = *p1++ - *p2++; s += f * f; }
    return NewRealCell(exp(-sqrt(s)/gamma));
}; // xgaussd static bool xgaussdS = DefineFunction("gaussd", xgaussd);

//////////////////////////////////////////////////////////
// Hyper

CP xnew_hyper(CP param) {
    unsigned s = (unsigned)a_real(param);
    SimilarityMeasure *sm = (SimilarityMeasure*)s;
    Hyper *hyper = new Hyper(sm, param == Nil ? 0 : (int)a_real(param));
    return NewRealCell(Real(unsigned(hyper)));
```

```
}; // xnew_hyper

CP xset_hyper_db(CP param) {
    unsigned x = (unsigned)a_real(param);
    Hyper *h = (Hyper*)x;
    Matrix xa = a_matrix(param); int la = xa.elements();
    Matrix xb = a_matrix(param); int lb = xb.elements();
    IntVec pa(la), pb(lb);
    for (int i=0; i<la; i++) pa[i] = (int)xa(i);
    for (    i=0; i<lb; i++) pb[i] = (int)xb(i);
    h->SetDataBase(pa, la, pb, lb);
    return Nil;
}; // xset_hyper_db CP xset_hyper_support(CP param) {
    unsigned x = (unsigned)a_real(param);
    Hyper *h = (Hyper*)x;
    Matrix xa = a_matrix(param); int la = xa.size();
    Matrix xb = a_matrix(param); int lb = xb.size();
    IntVec pa(la), pb(lb);
    for (int i=0; i<la; i++) pa[i] = (int)xa(i);
    for (    i=0; i<lb; i++) pb[i] = (int)xb(i);
    if (param == Nil) { h->SetSupport(la, lb, pa, pb); return Nil; }
    Matrix aa = a_matrix(param);
    Matrix ab = a_matrix(param);
    if (la != aa.size()) error('E', "class A: # alphas <> # supp. patterns");
    if (lb != ab.size()) error('E', "class B: # alphas <> # supp. patterns");
    FltVec aav(la), abv(lb);
    for (i=0; i<la; i++) aav[i] = aa(i);
    for (i=0; i<lb; i++) abv[i] = ab(i);
    h->SetSupport(la, lb, pa, pb, aav, abv);
    return Nil;
}; // xset_hyper_support CP xget_hyper_support(CP param) {
    unsigned x = (unsigned)a_real(param);
    Hyper *h = (Hyper*)x;
    int *supA, *supB, na, nb; Flt *alphaA, *alphaB;
    h->GetSupport(na, nb, supA, supB, alphaA, alphaB);
    Matrix sa = NewMatrix(na);
    Matrix sb = NewMatrix(nb);
    Matrix aa = NewMatrix(na);
    Matrix ab = NewMatrix(nb);
    for (int i=0; i<na; i++) { sa(i) = supA[i]; aa(i) = alphaA[i]; }
    for (    i=0; i<nb; i++) { sb(i) = supB[i]; ab(i) = alphaB[i]; }
    return
```

30

```
              NewConsCell(NewMatrixCell(sa),
                    NewConsCell(NewMatrixCell(sb),
                          NewConsCell(NewMatrixCell(aa),
                                NewConsCell(NewMatrixCell(ab))))));
}; // xget_hyper_support CP xhyper_step(CP param) {
   unsigned x = (unsigned)a_real(param);
   Hyper *h = (Hyper*)x;
   h->HyperStep(a_real(param));
   return NewRealCell(h->RohOpt());
}; // xhyper_step CP xhyper_psi_x(CP param) {
   unsigned x = (unsigned)a_real(param);
   Hyper *h = (Hyper*)x;
   return NewRealCell(h->Psi_x(int(a_real(param))));
}; // xhyper_psi_x CP xhyper_classify(CP param) {
   unsigned x = (unsigned)a_real(param);
   Hyper *h = (Hyper*)x;
   return NewRealCell(h->Classify(int(a_real(param))));
}; // xhyper_classify CP xhyper_classifier(CP param) {
   unsigned x = (unsigned)a_real(param);
   Hyper *h = (Hyper*)x;
   return NewRealCell(h->Classifier(param != Nil ? a_real(param) : 0.1));
}; // xhyper_classifier CP xhyper_roh(CP param) {
   unsigned x = (unsigned)a_real(param);
   Hyper *h = (Hyper*)x;
   return NewRealCell(h->RohOpt());
}; // xhyper_roh static bool new_hyperS = DefineFunction("new-hyper", xnew_hyper);
static bool hyper_dbS = DefineFunction("set-hyper-db", xset_hyper_db);
static bool hyper_cS = DefineFunction("hyper-classifier", xhyper_classifier);
static bool hy_suS = DefineFunction("set-hyper-support", xset_hyper_support);
static bool hy_geS = DefineFunction("get-hyper-support", xget_hyper_support);
static bool hyper_stepS = DefineFunction("hyper-step", xhyper_step);
static bool hyper_psi_xS = DefineFunction("hyper-psi-x", xhyper_psi_x);
static bool hyper_classifS = DefineFunction("hyper-classify", xhyper_classify);
static bool hyper_roh = DefineFunction("hyper-roh", xhyper_roh);
```

```
// Sort.h
// B. Boser 1/10/92 typedef double T1;
typedef int    T2;

// template
void sort(int n, int ascending, T1 *ra, T2 *rb) {
    ra--; rb--;
        int l,j,ir,i;
        T1 rra;
        T2 rrb;

if (n < 2) return;
    l=(n >> 1)+1;
    ir=n;
    for (;;) {
            if (l > 1) {
                    rra=ra[--l];
                    rrb=rb[l];
            } else {
                    rra=ra[ir];
                    rrb=rb[ir];
                    ra[ir]=ra[1];
                    rb[ir]=rb[1];
                    if (--ir == 1) {
                            ra[1]=rra;
                            rb[1]=rrb;
                            return;
                    }
            }
            i=l;
            j=l << 1;
            while (j <= ir) {
                    if (j < ir && (ascending ?
                            ra[j] < ra[j+1] : !(ra[j] < ra[j+1]))) ++j;
                    if (ascending ? rra < ra[j] : !(rra < ra[j])) {
                            ra[i]=ra[j];
                            rb[i]=rb[j];
                            j += (i=j);
                    }
                    else j=ir+1;
            }
            ra[i]=rra;
            rb[i]=rrb;
    }
}
```

```
}; // sort2
// Vector.c
// B. Boser  1/10/92 include "Vector.h"

flt dot(flt *x, flt *y, unsigned n) {
   flt s = 0;
   for (int i=0; i<n; i++) s += *x++ * *y++;
   return s;
}; // dot flt vmv(flt *v, flt **m, unsigned n) {
   flt s = 0;  flt *vp = v;
   for (int i=0; i<n; i++) s += *vp++ * dot(*m++, v, n);
   return s;
}; // vmv flt tally(flt *v, unsigned n) {
   flt s = 0;
   for (int i=0; i<n; i++) s += *v++;
   return s;
}; // tally void init(flt *v, unsigned n, flt x) {
   for (int i=0; i<n; i++) *v++ = x;
}; // init
```

Appendix 2

```
; usage:
;   (classifier name
;           training-data-base
;           test-data-base
;           [ precision          ; default: .1
;             roh_min            ; default: 0
;             order              ; default: 1
;           ]
;   )
; Creates a an optimal hyper-plane classifier and saves all data
; (report, maps, hyperplanes) under files called 'name' plus a
; suitable extention. If classifier is called repeatedly, data
; computed previously is reused if it exists (e.g. the hyper-planes
; are not recomputed if they exist already). The data-bases must
; be maps with the members "pattern" and "label" predefined. The
; type of "pattern" must be matrix (1-D, all identical), but "label"
; can be any type (the program figures out the number of classes
; from examining the different labels). Once a classifier has been
; generated, 'classifier' can be called again with identical
; arguments but another "test-data-base" to get a report on the
; performance.
;
; (confusion-plot name lab1 lab2 db-train db-test)
; The procedure "classifier" prints a confusion-matrix for the test
; data. This function plots the separation of 2 classes (specified
; by their labels lab1 and lab2) for a training and a test set.
;
; (pair-classifier name
;           training-data-base
;           test-data-base
;           [ precision          ; default: .1
;             [ roh_min          ; default: 0
;               [ order ] ]      ; default: 1
; )
;
; functions:
;   classifier:    create data-base and classifier (if non-existant),
;                  and perform test
;   make-maps:     create special views of data base
;   make-classifier: create and save an optimal hyperplane
;                  for each class
;   report:        print out properties about the classifier
;   performance:   check and report the performance of the classifier
;   confusion-plot: draw a confusion plot for two classes
```

3 4

```
;
; globals:
; hyper:      array of hyper planes (i.e. the classifier)
; train:      maps, labels for training set
; label-map:  mapping from index to labels (which may be e.g. strings)
; freport:    report file (de browse (name i)
    ; return map with removed patterns
    (let ((fin (fopen (+ name "-classifier.b") "r"))
          (hp ())
          (simm (new-sm K (* (==> mapA size) (==> mapB size)))))
      (for (j 1 i) (==> hyper-plane load fin simm))
      (setq hp (==> hyper-plane load fin))
      (when hp
          (==> hp info stdout)
          (let ((mapA :hp:mapA)
                (mapB :hp:mapB)
                (supA :hp:supA)
                (supB :hp:supB))
             (when ~db-browser (load "db-browser.l"))
             (==> mapA name "Class A Training Data")
             (==> mapB name "Class B Training Data")
             (==> supA name "Class A Supporting Patterns")
             (==> supB name "Class B Supporting Patterns")
             (list mapA (new db-browser mapA mapB supA supB))
          ); let
      ); when
    ); let
); browse (de clean (name &optional support)
    ; return map with removed patterns
    (let ((fin (fopen (+ name "-classifier.b") "r"))
          (hp ())
          (simm (new-sm K (* (==> mapA size) (==> mapB size))))
          (mm '(new db-browser)))
      (while (setq hp (==> hyper-plane load fin simm))
          (let ((m (if support :hp:supA :hp:mapA)))
             (when m
                (==> m first)
                (==> m name (sprintf "%s %s %l"
                                (==> m name)
                                (if support "support" "")
                                (==> m get 'label)))
                (setq mm (nconc1 mm m))
```

```
      ); when
    ); let
  ); while
  (when ~db-browser (load "db-browser.l"))
  (eval mm)
  ); let
); clean (de display-info (name &optional f)
  (if f (setq f (fopen (+ name "-info.txt") "w"))
      (setq f stdout))
  (let ((fin (fopen (+ name
                        (if pair "-pair" "")
                        "-classifier.b") "r"))
        (hp ()))
    (when fin
      (while (setq hp (==> hyper-plane load fin))
        (==> hp info f)
        (when (= f stdout) (ask "continue? "))
      ); while
    ); when
  ); let
); display-info (de classifier (name db-train db-test &optional (eps 0.1) (order 1))
  (setq hyper () train () label-map ())
  (setq freport (fopen (+ name "-report.txt") "a"))
  (printf "writing report to file '%s'0 (pname freport))  (fflush stdout)
  (writing freport
    (printf "0) (for (i 0 76) (printf "-"))
    (printf "0YPER-PLANE EXPERIMENT FOR DATA-BASE '%s'0 name)
    (printf "host: %l0 (read (fopen "| hostname" "r")))
    (when message (message))
    (fflush freport)
    (load-all name eps roh_min () order)
;    (rewind freport)
    (when db-train
        (report name db-train)
;        (printf "23erformance on Training set:0)
;        (performance db-train ())
    )
    (when db-test
        (printf "23erformance on Test set:0)
        (performance db-test ())
    )
  ); writing
```

```
        (fclose freport)
); classifier (de pair-classifier (name db-train db-test &optional (eps .1) (order 1))
    (setq hyper () train () label-map ())
    (setq freport (fopen (+ name "-report.txt") "w"))
    (printf "writing report to file '%s'0 (pname freport))  (fflush stdout)
    (writing freport
        (printf "0)  (for (i 0 76) (printf "-"))
        (printf "0YPER-PLANE EXPERIMENT FOR DATA-BASE '%s'0 name)
        (when message (message))
        (fflush freport)
        (load-all name eps roh_min t order)
        (when db-train
            (report name db-train)
;           (printf "24erformance on Training set:0)
;           (performance db-train t)
        )
        (when db-test
            (printf "24erformance on Test set:0)
            (performance db-test t)
        )
        (comment
            (printf "0onstructing training and test sets for second stage0)
            (setq db-stage2-train (make-set (+ name "-train2.db") db-train))
            (setq db-stage2-test  (make-set (+ name "-test2.db" ) db-test))
            (setq hyper () train ())
            (classifier (+ name "-stage2")
                    (==> map new 'db-stage2-train)
                    (==> map new 'db-stage2-test)
                    eps roh_min t
        )
        )
    ); writing
    (fclose freport)
); pair-classifier (de make-set (name db)
    (when ~(classp class2)
        (dc class2 object pattern label)
    ); when
    (let ((vec (disk-array name 1024)))
        (for (i 0 (1- (==> db size)))
            (vec i (==> class2 new
                    (pattern (pair-classify (==> db get 'pattern)))
                    (label (==> db get 'label)) )
```

37

```
            )
          (==> db next)
       ); for i
       (vec 'fflush)
       (let ((dbnew (==> data-base new (==> db size))))
            (==> dbnew bind-class 'pattern 'pattern vec)
            (==> dbnew bind-class 'label   'label   vec)
            (==> dbnew bind 'record vec)
            dbnew
       ); let dbnew
    ); let vec
); make-set (de pair-classify (pat)          ; return vector with n(n-1)/2 activations
    (let ((m (matrix ((lambda (x) (2/ (* x (1+ x)))) (bound hyper 1))))
          (k 0))
        (for (i 0 (bound hyper 1))
             (for (j (1+ i) (bound hyper 1))
                  (m k (==> (hyper i j) classify pat))
                  (incr k)
             ); for j
        ); for i
        m
    ); let m
); pair-classify (de load-all (name eps roh_min &optional pair (order 1))
    (when (or ~train ~label-map) (let ((fin (fopen (+ name "-maps.b") "r")))
       (if fin (progn
                (setq train (read fin))
                (setq label-map (read fin))
                (fclose fin)
               )
               (make-maps name db-train)
       ); if
    )); when, let
    (when ~hyper
      (if pair
          (progn
            (let ((fin (fopen (+ name "-pair-classifier.b") "r"))
                  (simm (new-sm K 9000017)))
                (setq hyper (array (1+ (bound train 1)) (1+ (bound train 1))))
                (when fin
                     (for (i 0 (bound train 1))
                          (for (j (1+ i) (bound train 1))
                               (hyper i j (==> hyper-plane load fin simm))
```

```
            ); for j
          ); for i
        ); when fin
      ); let fin
      (make-pair-classifier name eps roh_min)
    ); progn pair
    (progn
      (let ((fin (fopen (+ name "-classifier.b") "r"))
            (simm (new-sm K 9000017)))
        (setq hyper (array (1+ (bound train 1))))
        (when fin
          (for (i 0 (bound train 1))
            (hyper i (==> hyper-plane load fin simm))
          ); for i
        ); when fin
      ); let fin
      (make-classifier name eps roh_min order)
    ); progn ~pair
  ); if pair
 ); when
); load-all (de qualified (db)
  (or ~(==> db get 'quality)
      (= (==> db get 'quality) "good")
  ); or
); qualified (de make-maps (name db-train)
  (printf "Oreating maps for training set0)
  (let ((db (array 1000))     ; no more than 1000 labels please
        (labels 0)            ; number of labels found so far
        (i 0)                 ; scratch variable
        (omit 0)              ; omitted patterns
       )
    (setq label-map (array 1000))
    (printf "training database: %d patterns0 (==> db-train size))
    (repeat (==> db-train size)
      (if (qualified db-train)
        (if (setq i (exists label-map labels (==> db-train get 'label)))
          (==> (db i) append (==> db-train index))
          ; construct a new view
          (let ((m (==> db-train empty)))
            (==> m append (==> db-train index))
            (db labels m) (label-map labels (==> db-train get 'label))
            (incr labels)
```

39

```
                    (printf " %3d. label is %10 labels (==> db-train get 'label))
                    (fflush freport)
                ); let
            ); if
                (incr omit)
        ); if qualified
            (==> db-train next)
    ); repeat
    (setq db (db (list 0 (1- labels))))
    (setq label-map (label-map (list 0 (1- labels))))
    ; construct train, to global array of data-basees
    (setq train (array labels))
    (for (i 0 (bound db 1))
            (==> (db i) prune)
            (train i (list (db i) (all-but db i)))
            (printf " label %l (index %3d): %4d patterns, total %4d0
                    (label-map i) i (==> (db i) size)
                    (+ (==> (db i) size) (==> (cadr (train i)) size))
        )
        (fflush freport)
    ); for
    (printf " %d (bad) patterns omitted from test-data0 omit)
    (let ((fout (fopen (+ name "-maps.b") "w")))
        (write-binary fout train)
        (write-binary fout label-map)
        (fclose fout)
    ); let fout
    ); let db array
); make-maps (de exists (arr len key)
    (let ((r ()))
        (for (i 0 (1- len))
                (when (= (arr i) key) (setq r i))
        )
        r
    )
); exists (de label2index (label)
    (let ((r ()))
        (for (i 0 (bound label-map 1))
                (when (= (label-map i) label) (setq r i))
        )
        r
    )
)
```

```
); label2index (de index2label (idx)
   (if idx (label-map idx) ())
); index2label (de all-but (db i)
   (let ((base (==> (db 0) empty)))
      (for (j 0 (bound db 1))
           (when (<> i j) (setq base (map-join base (db j))))
      )
      (==> base sort-index) (==> base prune) base
   )
); all-but (de make-classifier (name eps roh_min order)
   (printf "0inding hyper planes with optimal margin0)
   (when ~hyper (setq hyper (array (1+ (bound train 1)))))
   (let ((fout (fopen (+ name "-classifier.b") "w"))
         (simm (new-sm K (* 9000017))))
      (for (i 0 (bound hyper 1))
           (let (((c1 c2) (train i)))
              (when ~(hyper i)
                 (fprintf stdout "hyper-plane for class %l vs. all others0
                         (==> c1 get 'label))
                 (fprintf freport "hyper-plane for class %l vs. all others0
                         (==> c1 get 'label))
                 (fflush freport)
                 (hyper i (new hyper-plane c1 c2 simm
                            order eps debug1))
                 (==> (hyper i) info stdout)
                 (==> (hyper i) info freport)
              )
              (==> (hyper i) save fout)
           )
      ); for
      (fclose fout)
   ); let
); make-classifier (de make-pair-classifier (name eps roh_min)
   (printf
      "0inding hyper planes for pairwise separation with optimal margin0)
   (when ~hyper
        (setq hyper (array (1+ (bound train 1)) (1+ (bound train 1))))
   )
```

```
    (let ((fout (fopen (+ name "-pair-classifier.b") "w")))
      (for (i 0 (bound hyper 1))
        (for (j (1+ i) (bound hyper 1))
          (let (((c1 dummy) (train i))
                ((c2 dummy) (train j)))
            (when ~(hyper i j)
                (fprintf stdout "hyperplane for %l vs %l0
                        (==> c1 get 'label) (==> c2 get 'label))
                (fprintf freport "hyperplane for %l vs %l0
                        (==> c1 get 'label) (==> c2 get 'label))
                (fflush freport)
                (hyper i j (new hyper-plane c1 c2
                        order eps debug1 func))
                (==> (hyper i j) info stdout)
            ); when ~hyper
                (==> (hyper i j) save fout)
          ); let
        ); for j
      ); for i
      (fclose fout)
    ); let
); make-pair-classifier (de report (name db-train)
    (printf "0yper plane classifier for %2d classes" (1+ (bound train 1)))
    (printf"0==================================0)
(comment
    (when (or ~(==> (hyper 0) privatep 'Dmin)
              ~:(hyper 0):Dmin)
        (fprintf stdout "computing diameter of data-base0)
        (==> (hyper 0) diameter db-train)
        (let ((f (fopen (+ name "-classifier.b") "w")))
          (for (i 0 (bound hyper 1))
            (when (0<> i)
                    (==> (hyper i) private 'D    :(hyper 0):D  )
                    (==> (hyper i) private 'Dmin :(hyper 0):Dmin)
                    (==> (hyper i) private 'Dmax :(hyper 0):Dmax)
            )
                (==> (hyper i) save f)
          ); for
          (fclose f)
        ); let
    ); when
)
    (mapmc (flambda (db h)
            (printf "hyper-plane for class %l vs. all others0
```

```
                              (==> (car db) get 'label) )
                        (==> h info freport)
(comment
                 (let* ((supA :h:supA)
                        (supB :h:supB)
                        (eliB :h:eliB)
                        (eliB :h:eliB))
                       (draw-map supA
                         (sprintf "%s-support-classA-%d" name (==> supA get 'label)))
                       (draw-map supB
                         (sprintf "%s-support-classB-%d" name (==> supA get 'label)))
                       (draw-map eliA (sprintf "%s-eliminated-classA-%d"
                                               name (==> supA get 'label)))
                       (draw-map eliB (sprintf "%s-eliminated-classB-%d"
                                               name (==> supA get 'label)))
              ); let*
  )
        ); flambda
          train hyper
     ); mapmc
); report (de draw-map (db name)
  ; db:    map to draw
  ; name:  name of ps file(s)
  ; xs:    scale factor in x-dimension
  ; ys:    scale factor in y-dimension
  (when (and db (0<> (==> db size)))
    (fprintf stdout "plotting %s0 name)
    (==> (window ()) clear)
    (let* ((page 1)
           (x0 130) (y0 650)    ; offset from lower left corner
           (xm 450) (ym 550)    ; page size
           (xx  0) (yy  0)      ; current position
           (p ()))
       (==> db first)
       (==> (window) text (- x0 60) (+ y0 120)
            (sprintf "%s    Page %d" name page)
            (font helvetica 18 bold)
       )
       (repeat (==> db size)
               (graphics-batch
                 (setq p (==> (window) picture))
                 (==> (==> db get 'record) draw p)
                 (==> p scale (/ 100 (apply 'max (==> p size-points))))
                 (==> p align (+ x0 xx) (- y0 yy) 7)
```

4 3

```
                    )
                    (incr xx 120)
                    (when (> xx xm) (setq xx 0) (incr yy 120))
                    (when (> yy ym)
                        (setq yy 0)
                        (==> (window) save (sprintf "%s-page-%d.ps" name page))
                        (incr page)
                        (==> (window) clear)
                        (==> (window) text x0 (+ y0 80)
                            (sprintf "%s     Page %d" name page)
                            (font helvetica 18 bold)
                        )
                    ); when
                    (==> db next)
                ); repeat
                (==> (window) save (sprintf "%s-page-%d.ps" name page))
            ); let*
        ); when
    ); draw-map (de performance (db &optional pair)
    (let* ((dim (1+ (bound hyper 1)))
            (conf (matrix dim dim))
            (err 0) (punt 0) (punt-good 0) (punt-bad 0)
            (good 0) (total 0)
            (db-miss (==> db empty))
            (db-reje (==> db empty)))
        (fflush freport)
        (repeat (==> db size)
            (let* (((result-index dist-vec lab-vec)
                        ((if pair classify-pair classify) (==> db index)))
                    (result-label (index2label result-index))
                    (desired-label (==> db get 'label))
                    (desired-index (label2index desired-label))
                )
                (if result-index
                    (progn           ; accept
                        (conf result-index desired-index
                            (1+ (conf result-index desired-index)))
                        (if (= result-label desired-label)
                            (incr good)
                            (incr err)
                            (printf "ERROR: got label %l for pattern %l "
                                    result-label desired-label)
                            (printf "(data-base index = %d)0 (==> db index))
                            (printf " %m0 lab-vec)
```

```
                        (printf " %m0 dist-vec)
                        (==> db-miss append (==> db index))
                        (fflush freport)
            ); if
         ); progn
             (progn           ; reject
                (incr punt)
                (setq result-label
                        (index2label (lab-vec (bound lab-vec 1))) )
                (if (= result-label desired-label)
                        (progn (printf "REJECT GOOD: ") (incr punt-good))
                        (progn (printf "REJECT BAD: ") (incr punt-bad))
           )
                (printf "got label %l for pattern %l "
                        result-label desired-label)
                (printf "(data-base index = %d)0 (==> db index))
                (printf " %m0 lab-vec)
                (printf " %m0 dist-vec)
                (==> db-reje append (==> db index))
                (fflush freport)
           ); progn
         ); if result-index
      ); let*
         (==> db next)
      (incr total)  (fflush freport)
); repeat
(let ((lg (fopen "log" "a")))
    (fprintf lg "%d%6g0 err (* 100 (/ err total)))
    (fclose lg)
)
(printf "32d errors, %d rejected (%d were wrong), %d good, %d total0
         err punt punt-bad good total)
(printf "performance: %f percent errors, %f percent rejected0
         (* 100 (/ err total))  (* 100 (/ punt total)) )
(when (0<> err)
    (printf "0onfusion matrix:")
    (printf "  des label")
    (for (des 0 (1- dim))
            (printf " %3s" (sprintf "%l" (index2label des)))
    )
    (print)
    (for (res 0 (1- dim))
            (printf "  got %3s [" (sprintf "%l" (index2label res)))
            (for (des 0 (1- dim)) (printf " %3d" (conf res des)))
            (printf " ]0)
    )
```

4-5

```
        ); when
        (fflush freport)
   ;    (draw-map db-miss (sprintf "%s-missed" name))
   ;    (draw-map db-reje (sprintf "%s-rejected" name))
     ); let* dim
); performance (de classify (id)            ; no rejects
   (let* ((dim (1+ (bound hyper 1)))
          (r (matrix dim))
          (l (matrix dim)))
      (for (i 0 (bound hyper 1))
         (when (hyper i)
               (r i (==> (hyper i) classify-id id))
               (l i i)
         ); when
      ); for
      (nr-sort2 r l)
      (list (l (bound l 1)) r l)
   )
); classify (de classify-pair (id)        ; no rejects
   (let* ((dim (1+ (bound hyper 1)))
          (r (matrix dim))
          (l (matrix dim)))
      (for (i 0 (bound hyper 1))
         (for (j (1+ i) (bound hyper 1))
            (let* ((x (==> (hyper i j) classify-id id)))
               (if (>= x 0) (r i (1+ (r i)))
                            (r j (1+ (r j))))
            )
         ); let* psi
      ); for j
   ); for i
   (l () (range 0 (1- dim)))
   (nr-sort2 r l)
   (list (l (bound l 1)) r l)
   ); let* r
); classify-pair (de mean (a b)
   (* (+ a b) 0.5)
); mean
```

```
; scatter plots (de confusion-plot (name lab1 lab2 db-train db-test &optional (visible t))
    (load-all name 0.2 0)
    (setq w (window)) (==> w clear)
    (==> w fgcolor blue)
    (==> w font (font helvetica 18 bold))
    (==> w pattern no-pattern)
    (setq p1 (==> plot new w 140 100 300 300))
    (setq p2 (==> plot new w 140 450 300 300))
    (==> p1 xaxis -6 6 2 1 (sprintf "Class %l" lab1))
    (==> p1 yaxis -6 6 2 1 (sprintf "Class %l" lab2))
    (==> p2 xaxis -6 6 2 1 "")
    (==> p2 yaxis -6 6 2 1 (sprintf "Class %l" lab2))
    (==> w fgcolor red)
    (setq f1 (==> p1 frame -6 -6 6 6))
    (setq f2 (==> p2 frame -6 -6 6 6))
    (==> f1 text 7 5 "Training Set")
    (==> f2 text 7 5 "Test Set")
    (==> f1 line -6 -6 6 6 (brush 1 dashed))
    (==> f2 line -6 -6 6 6 (brush 1 dashed))
    (scatter p1 p2 lab1 lab2 db-train db-test)
    (==> w save (+ name "-"
                    (if (stringp lab1) lab1 (sprintf "%l" lab1))
                    "vs"
                    (if (stringp lab2) lab2 (sprintf "%l" lab2))
                    ".ps"
        )
    )
); confusion-plot (de scatter (p1 p2 l1 l2 db-train db-test)
    (let* ((hp1 (hyper (label2index l1)))
           (hp2 (hyper (label2index l2))))
        (==> p1 mark 7 4.3 -1) (==> f1 text 7 4 (sprintf " class %l" l1))
        (==> p2 mark 7 4.3 1) (==> f2 text 7 4 (sprintf " class %l" l1))
        (==> p1 mark 7 3.3 2) (==> f1 text 7 3 (sprintf " class %l" l2))
        (==> p2 mark 7 3.3 -2) (==> f2 text 7 3 (sprintf " class %l" l2))
        (sc-plot p1 hp1 hp2 db-train l1 -1)
        (sc-plot p2 hp1 hp2 db-test l1  1)
        (sc-plot p1 hp1 hp2 db-train l2  2)
        (sc-plot p2 hp1 hp2 db-test l2 -2)
    )
); scatter (de sc-plot (pt hp1 hp2 db label marker)
```

```
(graphics-batch (repeat (==> db size)
        (when (= label (==> db get 'label))
             (let* ((x (==> hp1 classify (==> db get 'pattern)))
                    (y (==> hp2 classify (==> db get 'pattern))))
                (when (and (< (abs x) 6) (< (abs y) 6))
                    (==> pt mark x y marker))
            ); let*
       ); when
        (==> db next)
))
); sc-plot
```

4-8

We claim:

1. A method of classifying at a computer system input patterns received from an input device, the method comprising the steps of:
   a) determining a decision surface for classifying said input patterns, said determination of said decision surface being performed by i) deriving at said computer system a weighted sum of one or more selected associations of one of said input patterns with a training pattern from a predetermined set of training patterns contained in a storage device of said computer system, said one or more associations being selected such that said decision surface belongs to a subset with a smallest possible Vapnik-Chervonenkis dimension and ii) identifying at said computer system a number of adjustable parameters for said weighted sum, said adjustable parameters being identified such that said computer system can complete correct classification of said training patterns by performing a number of operations that is proportional to the number of adjustable parameters and the number of input patterns while leaving an optimal margin between said training patterns and said decision surface; and
   b) classifying each input pattern into one of two classes depending on which side of said determined decision surface said each input pattern falls.

2. The method of claim 1 further comprising the steps of:
   removing a selected subset of training patterns from the predetermined set of training patterns; and
   repeating steps a) and b) of claim 1 a finite number of times.

3. The method of claim 2 further comprising the step of:
   ranking the training patterns based on said adjustable parameters to determine which training patterns to remove.

4. The method of claim 1 further comprising the step of:
   removing from the training patterns all training patterns for which said adjustable parameters are equal to zero.

5. The method of claim 1 further comprising the step of:
   removing from the training patterns all training patterns for which the adjustable parameters fall below a given threshold.

6. A computer system for training a learning machine to classify input data received from an input device, said computer system comprising:
   means for determining a decision surface by i) deriving at said computer system a weighted sum of one or more selected associations of one of said input patterns with a training pattern from a predetermined set of training patterns contained in a storage device of said computer system, said one or more associations being selected such that said decision surface belongs to a subset with a smallest possible Vapnik-Chervonenkis dimension and ii) identifying at said computer system adjustable parameters for said weighted sum, said adjustable weighting parameters being identified such that said computer system can complete correct classification of said training patterns by performing a number of operations that is proportional to the number of adjustable parameters and the number of input patterns while leaving an optimal margin between said training patterns and said decision surface; and
   means for classifying each input pattern into one of two classes depending on which side of said determined decision surface said each input pattern falls.

7. The invention of claim 6 further comprising:
   means for removing from the predetermined set of training patterns all patterns that are unused in the determination of the decision surface.

8. The invention of claim 7 further comprising:
   means for further adjusting the adjustable parameters for the weighted sum in order to achieve better classification performance.

9. The invention of claim 6 wherein at least one of said associations is a kernel function which is selected from a group of kernel functions which includes a radial basis function, a high order polynomial function and an exponential function.

10. A method of classifying at a computer system input patterns received from an input device, the method comprising the steps of:
   determining weights associated with said input patterns to derive vectors that are mapped into a high dimension feature space;
   constructing an optimal hyperplane in said high dimension feature space to separate training patterns retrieved from said computer system, said separation being performed to ascertain particular locations of said training patterns with respect to said optimal hyperplane;
   deriving adjustable parameters by identifying a number of specific training patterns which are substantially closest to a boundary of said optimal hyperplane, said number of specific training patterns being substantially equal to a Vapnik-Chervonenkis dimension for said optimal hyperplane; and
   classifying said input patterns into one of two classes using said optimal hyperplane and said adjustable parameters.

* * * * *